United States Patent
Chen et al.

(10) Patent No.: US 7,698,691 B2
(45) Date of Patent: Apr. 13, 2010

(54) SERVER APPLICATION STATE

(75) Inventors: Boaz Chen, Redmond, WA (US); Shahar Prish, Redmond, WA (US); Juraj Slugen, Bellevue, WA (US); Liviu Asnash, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/230,906

(22) Filed: Sep. 20, 2005

(65) Prior Publication Data

US 2007/0067754 A1    Mar. 22, 2007

(51) Int. Cl.
G06F 9/44 (2006.01)
G06F 11/00 (2006.01)

(52) U.S. Cl. .................. 717/129; 717/123; 717/128; 717/133; 714/38; 714/100

(58) Field of Classification Search ......... 717/120–133; 714/38, 100
See application file for complete search history.

(56) References Cited

U.S. PATENT DOCUMENTS

| | | | | |
|---|---|---|---|---|
| 5,761,429 | A * | 6/1998 | Thompson | 709/224 |
| 6,513,157 | B1 * | 1/2003 | Glass | 717/165 |
| 6,654,948 | B1 * | 11/2003 | Konuru et al. | 717/127 |
| 7,305,663 | B1 * | 12/2007 | McGuire et al. | 717/130 |
| 7,424,646 | B2 * | 9/2008 | Smith | 717/128 |
| 7,457,989 | B2 * | 11/2008 | Ulrich et al. | 717/124 |
| 7,530,054 | B2 * | 5/2009 | Reimer et al. | 717/125 |
| 2002/0112044 | A1 * | 8/2002 | Hessmer et al. | 709/223 |
| 2002/0174415 | A1 * | 11/2002 | Hines | 717/127 |
| 2003/0056198 | A1 * | 3/2003 | Al-Azzawe et al. | 717/127 |
| 2004/0049565 | A1 * | 3/2004 | Keller et al. | 709/223 |
| 2004/0139432 | A1 | 7/2004 | Bender et al. | |
| 2004/0194054 | A1 * | 9/2004 | McGrath et al. | 717/100 |

FOREIGN PATENT DOCUMENTS

EP    1475714 A2    11/2004
WO    WO2004025471 A2    3/2004

OTHER PUBLICATIONS

De Rose et al., "The Dynamic Probe Class Library—An Infrastructure for Developing Instrumentation for Performance Tools", Computer Science Department, Univ. of Md. College Park, 2001, 7 pg.*

(Continued)

*Primary Examiner*—Wei Y Zhen
*Assistant Examiner*—Ryan D Coyer

(57) ABSTRACT

A server application discovers its relevant data objects and generates a report of the current states of such objects at a moment in time that is relevant to a detected failure. Responsive to a request for a server application state, the application can identify root objects; discover data types, values, and related objects through recursive traversal and analysis of the object hierarchies; and generate a state description of the application for review and analysis by others. The state discovery may be synchronized among multiple threads to ensure that the state description represents a snapshot of the server application state and a single point in its execution. The state description can be analyzed by validation tools to detect where the error might exist in the application and how the error might be corrected.

20 Claims, 8 Drawing Sheets

OTHER PUBLICATIONS

Demers et al., "Reflection in logic, functional and objet-oriented prgramming: a short comparative study", IJCIA, Aug. 1995, 11 pg.*
Potter et al., "The Ins and Outs of Objects", Australian Software Engineering Conference, 1998, 3 pg.*
International Search Report dated Jan. 22, 2007 for Application No. PCT/US2006/036617, 10 pages.
Microsoft Windows XP Resource Kits, Complete Memory Dump File, retrieved on Sep. 8, 2005 from Microsoft.com website using <URL: http://www.microsoft.com/resources/documentation/Windows/XP/all/reskit/en-us/prmd_stp_ukzl.asp, 1 page, Microsoft Corporation, Redmond, Washington.
Microsoft Windows XP Resource Kits, Kernel Memory Dump File, retrieved on Sep. 8, 2005 from Microsoft.com website using <URL: http://www.microsoft.com/resources/documentation/Windows/XP/all/reskit/en-us/prmd_stp_fpuo.asp, 1 page, Microsoft Corporation, Redmond, Washington.
Microsoft Windows XP Resource Kits, Small Memory Dump File, retrieved on Sep. 8, 2005 from Microsoft.com website using <URL: http://www.microsoft.com/resources/documentation/Windows/XP/all/reskit/en-us/prmd_stp_csqa.asp, 1 page, Microsoft Corporation, Redmond, Washington.
Microsoft Windows XP Resource Kits, Memory Dump File, retrieved on Sep. 8, 2005 from Microsoft.com website using <URL: http://www.microsoft.com/resources/documentation/Windows/XP/all/reskit/en-us/prmd_stp_mncs.asp, 1 page, Microsoft Corporation, Redmond, Washington.
Microsoft Windows WHDC web site, Dubugging Tools for Windows-Overview, retrieved on Sep. 8, 2005 from Microsoft.com website using <URL: http://www.microsoft.com/whdc/ddk/debugging/, 1 page, Microsoft Corporation, Redmond, Washington.

* cited by examiner

```
01  - <ServerState Time="08/22/2005 15:48:38.794632" Mode="Unsafe"
02      CodeBase="file:///C:/WINNT/assembly/GAC_MSIL/Microsoft.Office.Excel.Server.CalculationServer/
         12.0.0.0__94de0004b6e3fcc5/Microsoft.Office.Excel.Server.CalculationServer.dll" Machine="jslugen6"
         FileVersion="12.0.3208.3004">
03    + <EvictableItemListHead Id="66540731" Type="_class_">
04    - <ExcelServerApp Id="41622463" Type="_class_">
05        <Object Id="41622463" Type="_class_" />
06        <m_accessModel>Delegation</m_accessModel>
07     - <m_unusedItemManagersDescription Type="_list_">
08         <UnusedItemManagerDescription Type="UnusedItemManagerDescription" Id="31364015" />
09         <UnusedItemManagerDescription Type="UnusedItemManagerDescription" Id="28379535" />
10       </m_unusedItemManagersDescription>
11       <m_sessionManager Type="SessionManager" Id="64109423" />
12       <m_engineInterop>Microsoft.Office.Excel.Server.CalculationServer.Interop.EngineInterop</m_engineInterop>
13       <m_baseWorkbookManager Type="BaseWorkbookManager" Id="35236192" />
14       <m_connectionManager Type="ConnectionManager" Id="46228029" />
15       <m_backgroundTaskManager Type="BackgroundTaskManager" Id="49129953" />
16       <m_randomNumberGenerator>System.Security.Cryptography.RNGCryptoServiceProvider</m_randomNumberGenerator>
17       <m_requestManager Type="RequestManager" Id="2649323" />
18     - <m_unusedItemManagers Type="_list_">
19         <UnusedItemManager Type="UnusedItemManager" Id="20318803" />
20         <UnusedItemManager Type="UnusedItemManager" Id="52392654" />
21       </m_unusedItemManagers>
22       <m_memoryManager Type="MemoryManager" Id="28529661" />
23       <m_diskManager Type="DiskManager" Id="1954745" />
24       <m_closed>False</m_closed>
25     </ExcelServerApp>
26  · · ·
27    + <PseudoRequest Id="51484875" Type="_class_">
28    + <EvictableItemListHead Id="51235992" Type="_class_">
29    + <RequestManager Id="2649323" Type="_class_">
30    + <ExternalSourceStateInfo Id="0" Type="_class_">
31   </ServerState>
```

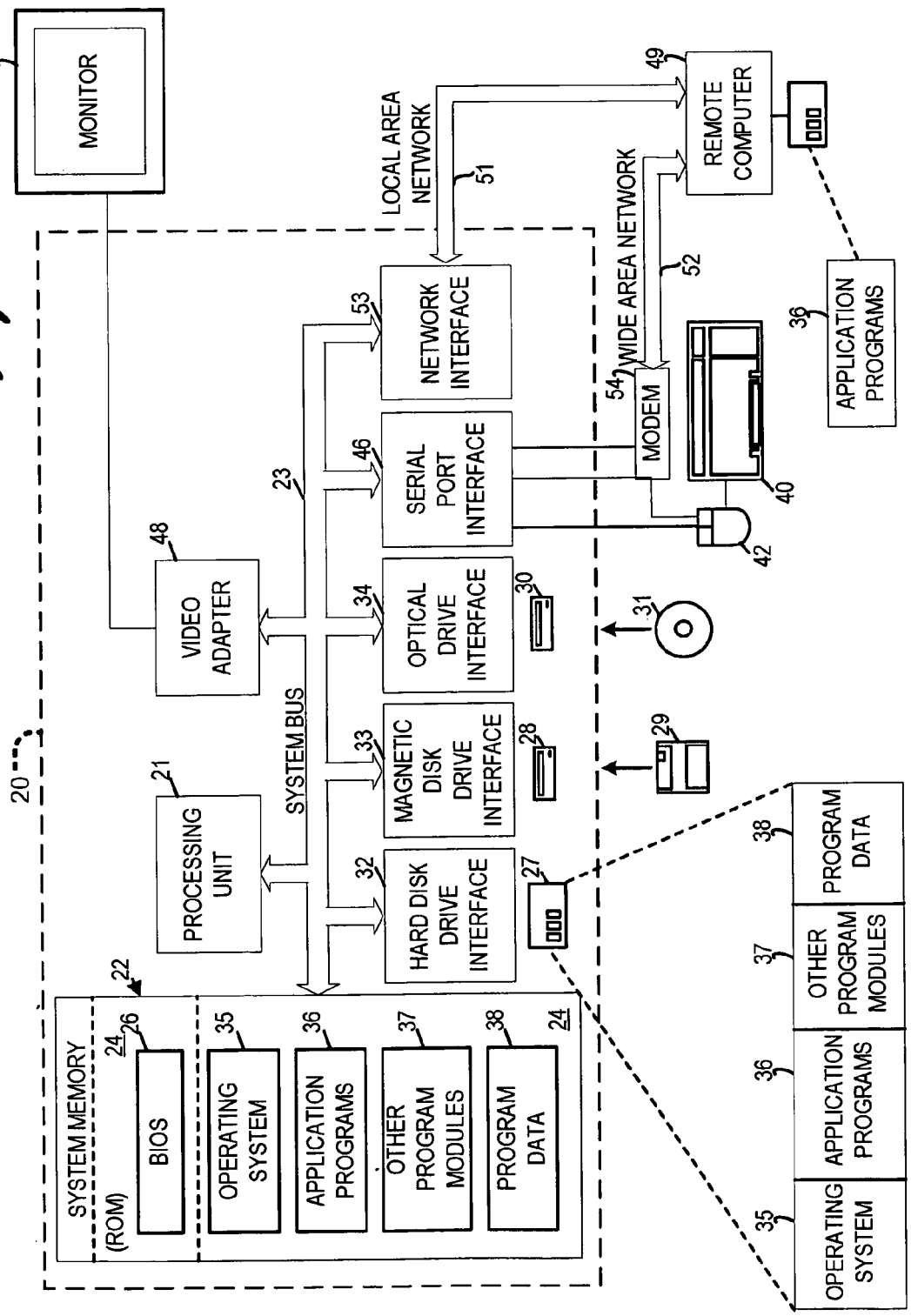

SERVER APPLICATION STATE

BACKGROUND

Certain server-based applications can be executed by users on one or more servers across a network. For example, rather than running individual applications (e.g., individual spreadsheet applications) on desktop computers, multiple users can access a server over an Intranet through their desktop computers and execute a server-based application (e.g., a server-based spreadsheet application) on that server. Through this server-based application, multiple users can manipulate common functionality and data available on that server.

A typical scenario might include a server-based accounting program that is accessed by multiple accountants from various enterprise departments. The server-based application receives user requests, creates and accesses data objects, performs appropriate computations on these data objects, and renders application-specific presentations of the computation results for display on the users' desktop computers (e.g., through browsers or proprietary client interfaces).

Troubleshooting errors that arise during the execution of such a server-based application is difficult. Traditionally, a software application may be tested by applying a set of inputs to the application and checking that the outputs are correct (e.g., regression testing). If the test fails, correcting the error that resulted in the failure is usually attempted by a combination of examining an application log, debugging a dump of some portions of application memory, and/or re-running the failed scenario within a debugger or with a special debug version of the software (e.g., a version compiled with run-time error detection features, such as ASSERTs, embedded in the program code).

However, these approaches become more complicated and less effective in a multi-threaded, server-based scenario supporting multiple remote users. Furthermore, while the techniques listed above may be useful, they have important limitations. For example, application logs are incremental and require an understanding of all application events occurring since the application was initiated. Memory dumps are difficult to read, lack a lot of information and context, and require substantial program knowledge and programming skills. Debugging generally requires reproduction of the failure in a different debug version of the software or on a different computing environment (e.g., on the workstation of a programmer). As such, these approaches do not adequately support troubleshooting of multi-threaded, server-based applications.

SUMMARY

Implementations described and claimed herein address the foregoing problems by discovering the relevant objects of a server application and generating a report of the current states of such objects at a moment in time that is relevant to a detected failure. Responsive to a request for a server application state, the application can identify root objects; discover data types, values, and related objects through recursive traversal and analysis of the object hierarchies; and generate a state description of the application for review and analysis by others. The state discovery may be synchronized among multiple threads to ensure that the state description represents a snapshot of the server application state at one or more individual points in its execution. The state description can be analyzed by validation tools to detect where the error might exist in the application and how the error might be corrected.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

FIG. 7 illustrates a redacted listing of an exemplary XML server application state file.

FIG. 8 illustrates a system that may be useful in implementing the described technology.

DETAILED DESCRIPTIONS

Figure 1:
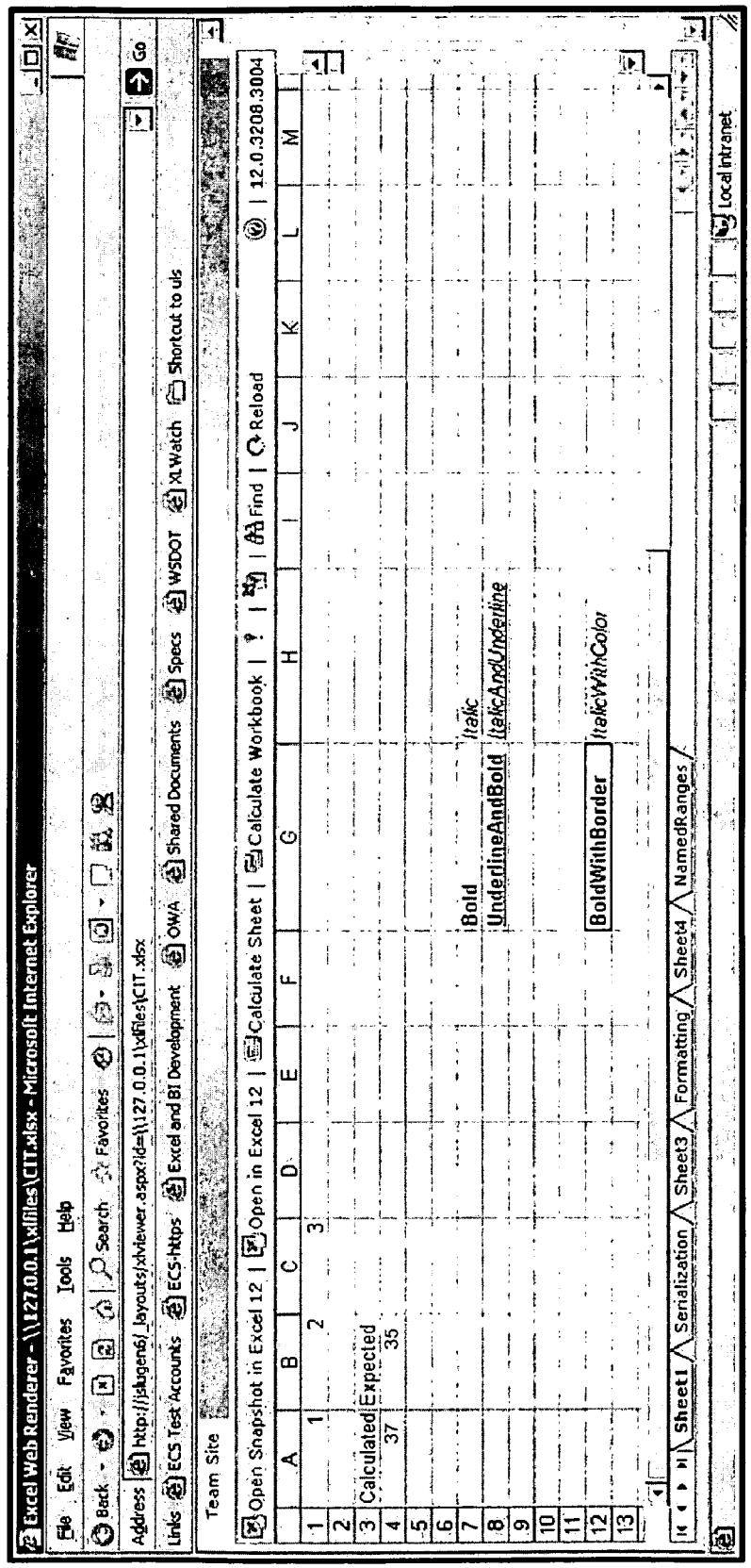
FIG. 1 illustrates a client display rendered by an exemplary server application.

FIG. 1 illustrates a client display rendered by an exemplary server application. Generally, a server application executes a set of instructions that can receive input, perform computations to change the internal state of the application, and generate output. For example, a server-based spreadsheet application can access data storage as input, receive user input, perform calculations, generate output to data storage, and generate output for use by a client application (e.g., a browser or other display or analysis program). The state of the application generally includes data managed in memory and/or other storage (e.g., a disk or database) by the application. The state of the application can also change over time; therefore, the state of the application at a specific moment in time (e.g., a "snapshot") may be collected into a state description for analysis.

A screenshot 100 of FIG. 1 includes a worksheet rendered by a server application for display in a web browser on a client computer. In the illustrated implementation, the results in the worksheet were computed and/or populated by program code in a calculation module executing on the server. Likewise, program code in a rendering module executing on the server also generated (i.e., rendered) HTML data that included the computation results and the worksheet display. The HTML data was then transmitted from the server to the client computer via a network interface, so that the browser could display the worksheet to a user.

In the screenshot 100, it is apparent that the calculated result ("37") in cell A4 does not match the expected result ("35") in cell B4. Accordingly, the user may suspect that a problem exists in the spreadsheet application running on the server and therefore contact a product support specialist (PSS) assigned to support the spreadsheet application. It should be understood that other types of errors may also occur including without limitation application crashes, display formatting errors, and other application and/or data failures. Server application states may be generated at one or more points in the application's execution by the user, PSS, developer, or other mechanism to assist in troubleshooting the problem. In another implementation, the server application state can be generated during development and testing to allow the capture of a state snapshot at one or more individual points in execution. The resulting state description can be reviewed by the developer or analyzed using debugging and/or testing tool to assist the developer in troubleshooting an apparent problem.

In one implementation, the PSS may request the user to execute a command (e.g., a state request) to generate a current snapshot of the server application state in the temporal proximity of the error and transmit the snapshot to the PSS for evaluation. Alternatively, the PSS may have access to the server and therefore execute the command directly to obtain the current snapshot of the server application state. An example of a command format to obtain the snapshot of the server application state is shown below, although other commands are contemplated:

ect-state>state-cit.xml wherein "ect" represents the command, "-state" designates the command as requesting a state description and the ">" symbol designates an output to a state description file entitled "state-cit.xml". In alternative implementations, the state request can be generated by selection of a user interface control, by the satisfaction of some predefined condition in the application, by remote triggering by a PSS, etc. The PSS can load the state description file into an analysis tool in an effort to diagnose the error in the server application. Exemplary state descriptions and state description files are described below.

Figure 2:
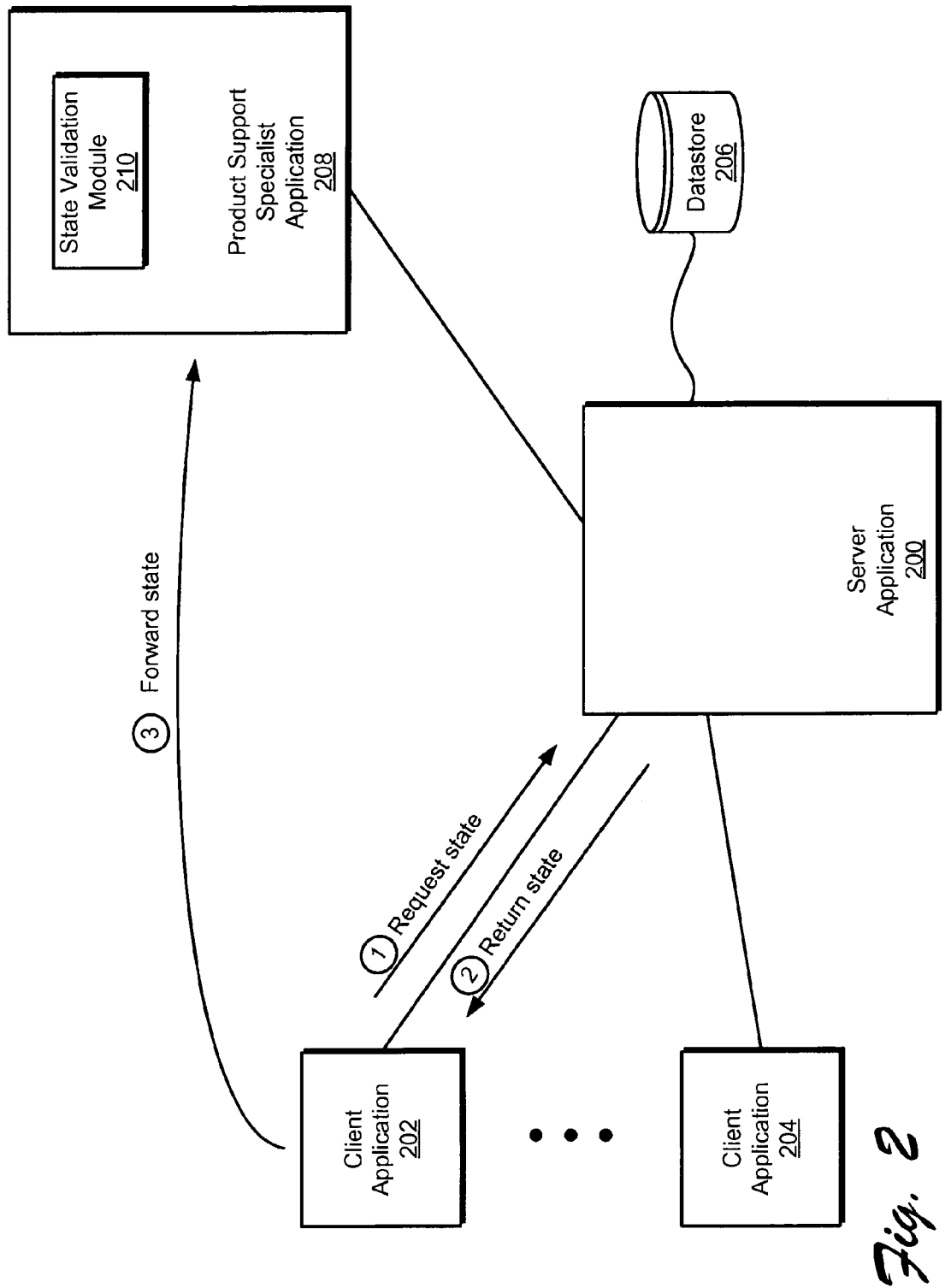
FIG. 2 illustrates communications relating to an exemplary server application.

FIG. 2 illustrates communications relating to an exemplary server application 200. As illustrated, multiple client applications 202-204 can access the server application 200 (e.g., executing a spreadsheet application on the server). The server application 200 has access to one or more locally or remotely attached datastores 206. It should be understood that the server application 200 may access the datastores 206 via a direct connection, a local area network (LAN), a wide area network (WAN), or some other communications channel. The datastores 206 may also be represented by offline data storage, such as magnetic disks, magnetic tapes, optical disks, and other offline data storage devices, which can be extracted from a library and made accessible by the server application 200.

If a user believes that the server application 200 is in error, the user may contact a PSS running a PSS application 208 to obtain assistance in diagnosing and correcting the problem. In the illustrated implementation, the PSS application 208 instructs the user to request (step 1) a state snapshot from the server application 200. The server application 200 responds (step 2) to the request by transmitting the state snapshot to the client application 202, which can then forward (step 3) the state snapshot to the PSS 208 for analysis by a state validation module 210. For example, the PSS application 208 can view the server application state in a viewer (see e.g., FIG. 4) or run other diagnostic software on the server application state information.

It should be understood that the described technology can be used in a variety of circumstances by a variety of individuals. For example, in a product support scenario, a released product may be evaluated by a support specialist by local or remote triggering. In another scenario, a product under development may be evaluated by a tester or developer to identify and correct a programming or configuration error. One particular technique for using an application state tool might include taking a snapshot of the application state at an execution point before a perceived error and then taking another snapshot of the application state at an execution point after a perceived error. In this manner, the snapshots can be jointly evaluated to isolate state changes between the two snapshots in an effort to troubleshoot the problem.

Figure 3:
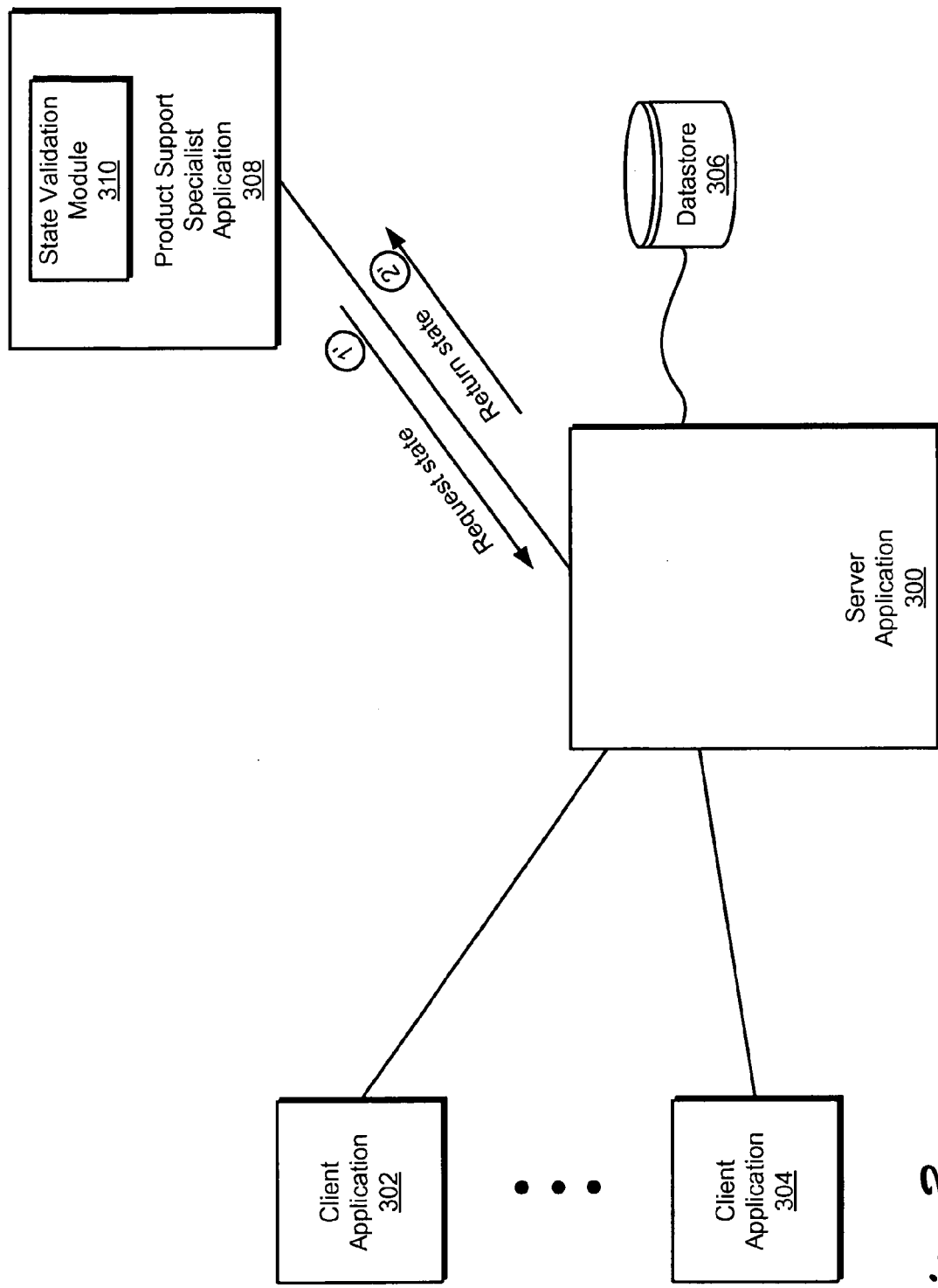
FIG. 3 illustrates alternative communications relating to an exemplary server application.

FIG. 3 illustrates alternative communications relating to an exemplary server application 300. As illustrated, multiple client applications 302-304 can access the server application 300 (e.g., executing a spreadsheet application on the server). The server application 300 has access to one or more locally or remotely attached datastores 306. It should be understood that the server application 300 may access the datastores 306 via a direct connection, a local area network (LAN), a wide area network (WAN), or some other communications channel. The datastores 306 may also be represented by offline data storage, such as magnetic disks, magnetic tapes, optical disks, and other offline data storage devices, which can be extracted from a library and made accessible by the server application 300.

If a user believes that the server application 300 is in error, the user may contact a PSS running a PSS application 308 to obtain assistance in diagnosing and correcting the problem. In the illustrated implementation, the PSS application 308 directly requests (step 1') a state snapshot from the server application 300. The server application 300 responds (step 2') to the request by transmitting the state snapshot to the PSS application 308 for analysis by a state validation module 310.

Figure 4:
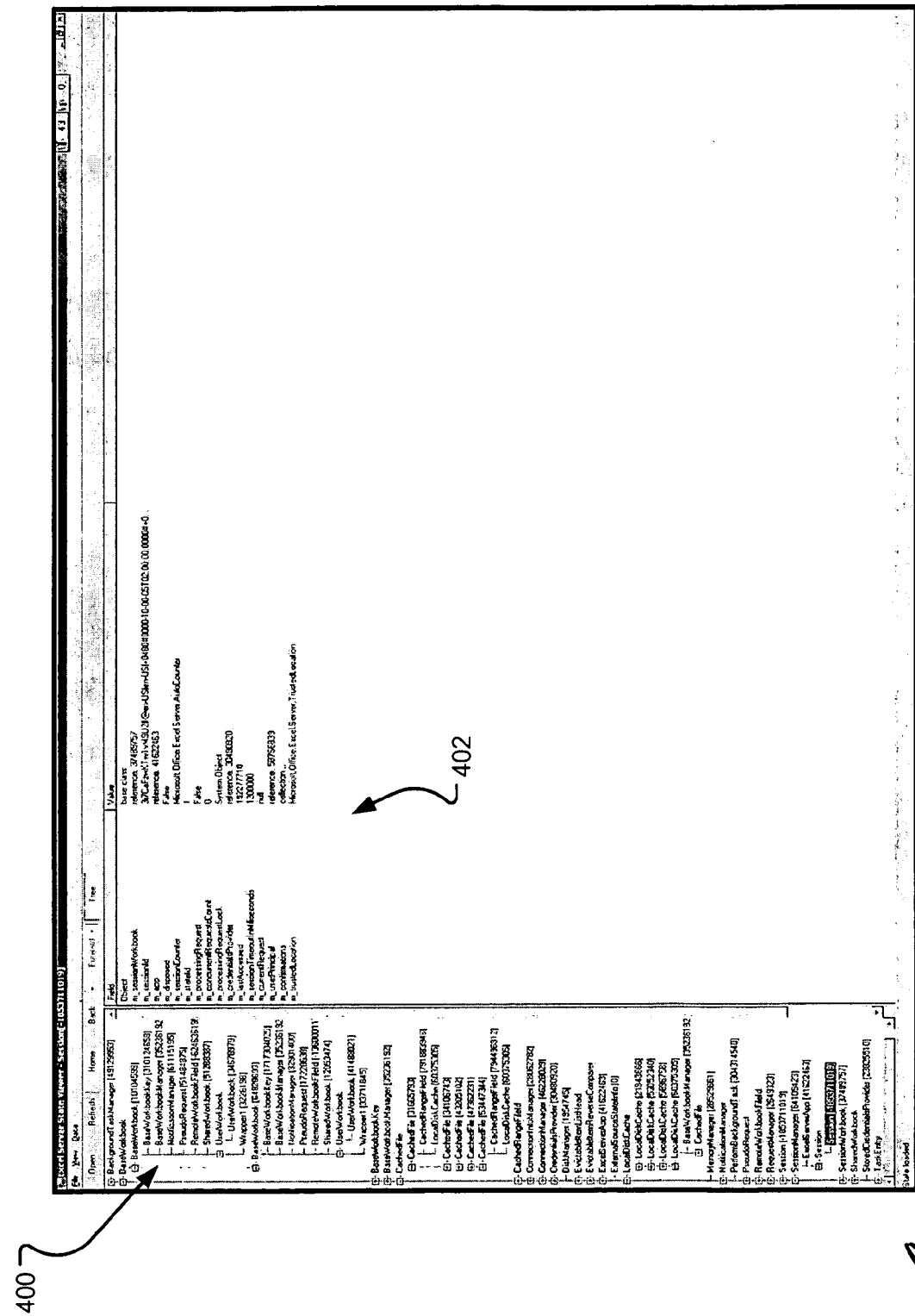
FIG. 4 illustrates exemplary object hierarchies of a server application and an exemplary state description of one of the objects.

FIG. 4 illustrates exemplary object hierarchies 400 of a server application and an exemplary state description 402 of one of the objects. To satisfy a request for a server application state snapshot, the server application (or an associated analysis application) identifies the root objects of the server application. This identification is typically specified within the server application itself or in an associated configuration file. Thereafter, the server application discovers the structure of each root object and each related object. In one implementation, the application uses reflection to discover the related objects, data types, values, and interrelationships of each root object. Then, the identification process traverses down through each root object hierarchy to discover individual related objects (e.g., ancestor objects, descendent objects, referenced objects, objects related by inheritance, objects in collections, objects in lists, etc.), the data members of each object, and their types and values.

For example, the identification process could identify each object that is a member of a root object and each object that is referenced by a root object. Then the identification process traverses down through the lower levels of hierarchy for each root object until the state of each related object is discovered (unless certain objects or types of objects are expressly omitted from the traversal process, e.g., by a configuration file, parameters, or program code). In another implementation, the server application can query each object through a standard interface to discover the internal structure (data types, values, etc.) of each object, and the object's related objects within the hierarchy.

In yet another implementation, the traversal and identification processes may be extended to support application-specific needs. For example, one or more objects may support an identification interface and a traversal interface to facilitate the discovery of objects, data types, and relationship. Such an interface may also be used to limit the discovery of certain objects, member data types and values, and relationships (e.g., passwords or encryption secrets). Furthermore, the interface may maintain security over which processes may access which objects of the server application.

The application state information discovered in the identification and traversal processes is recorded and output for subsequent processing. In one implementation, the information is output in XML format for viewing and/or analysis by a validation tool. For example, the state of individual objects can be viewed in a viewer (see FIG. 5), or analyzed against a set of rules, which can be implemented in a script, a sequence of conditions, a sequence of SQL-like queries, etc.

Figure 5:
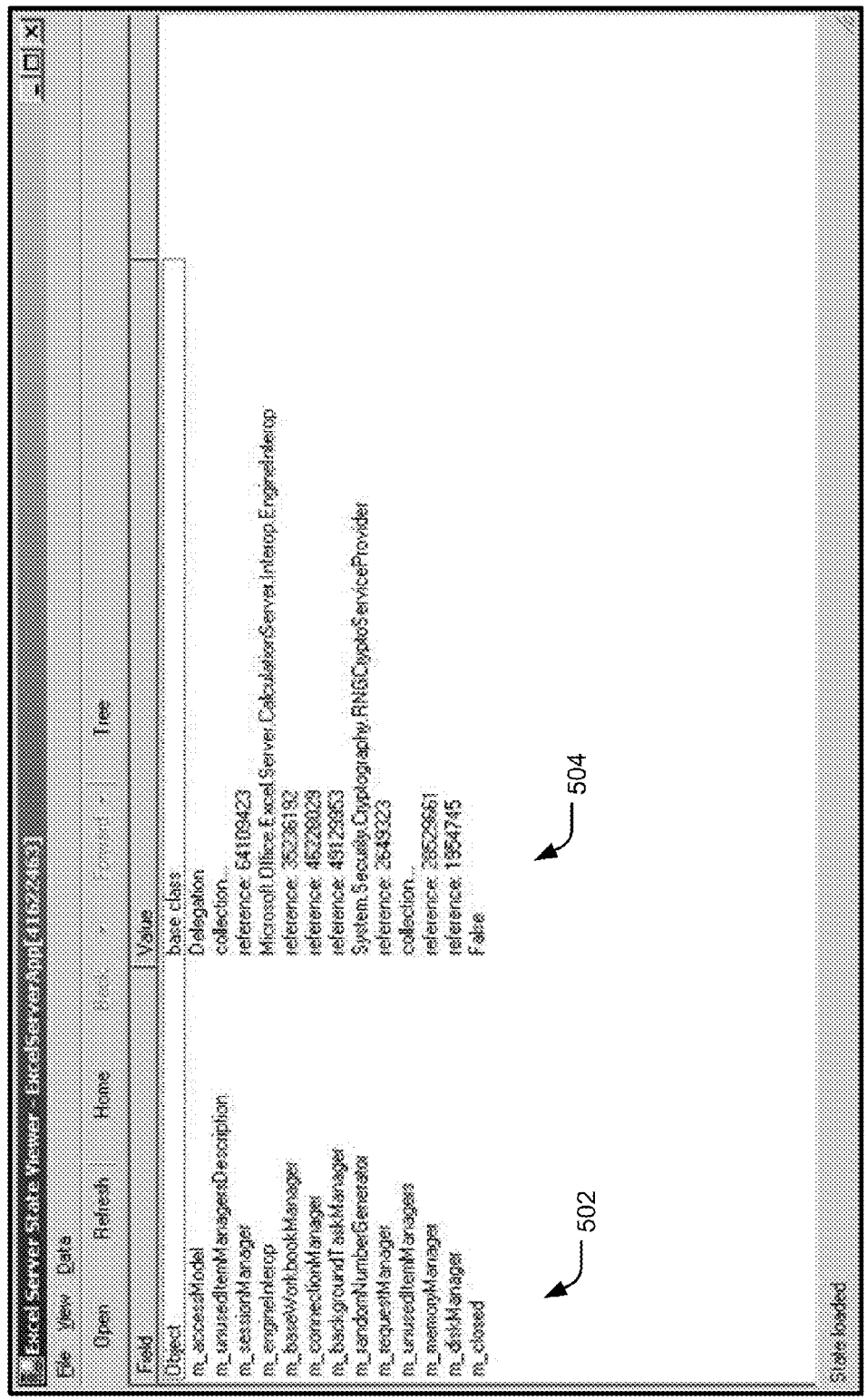
FIG. 5 illustrates an exemplary state description of a server application object.

FIG. 5 illustrates an exemplary state description 500 of a server application object. An object of type "ExcelServerApp" contains thirteen data fields, listed in the left column 502. The value of each data member and/or the type of each data member are listed in the right column 504. For example, an instance of the data type m_baseWorkbookManager in the ExcelServerApp object is designated as a reference of another object, wherein the reference has the value 35236192. Using this reference, the server application can traverse to the related m_baseWorkbookManager object for detailed discover of the m_baseWorkbookManager object's state.

In the displayed implementation, the displayed state information is read from an XML-formatted state description, although other formats are contemplated. A validation process can be executed on the XML state description based on the developer or support specialist's understanding of how the application should be operating. For example, given an expected result of 37 and a calculated result of 35, the developer can run a debug script on the state description itself to test the data objects, fields and interrelations that lead to the calculated result. If the developer has multiple states, the debug script can be used to track state changes that may have resulted in the error.

Figure 6:
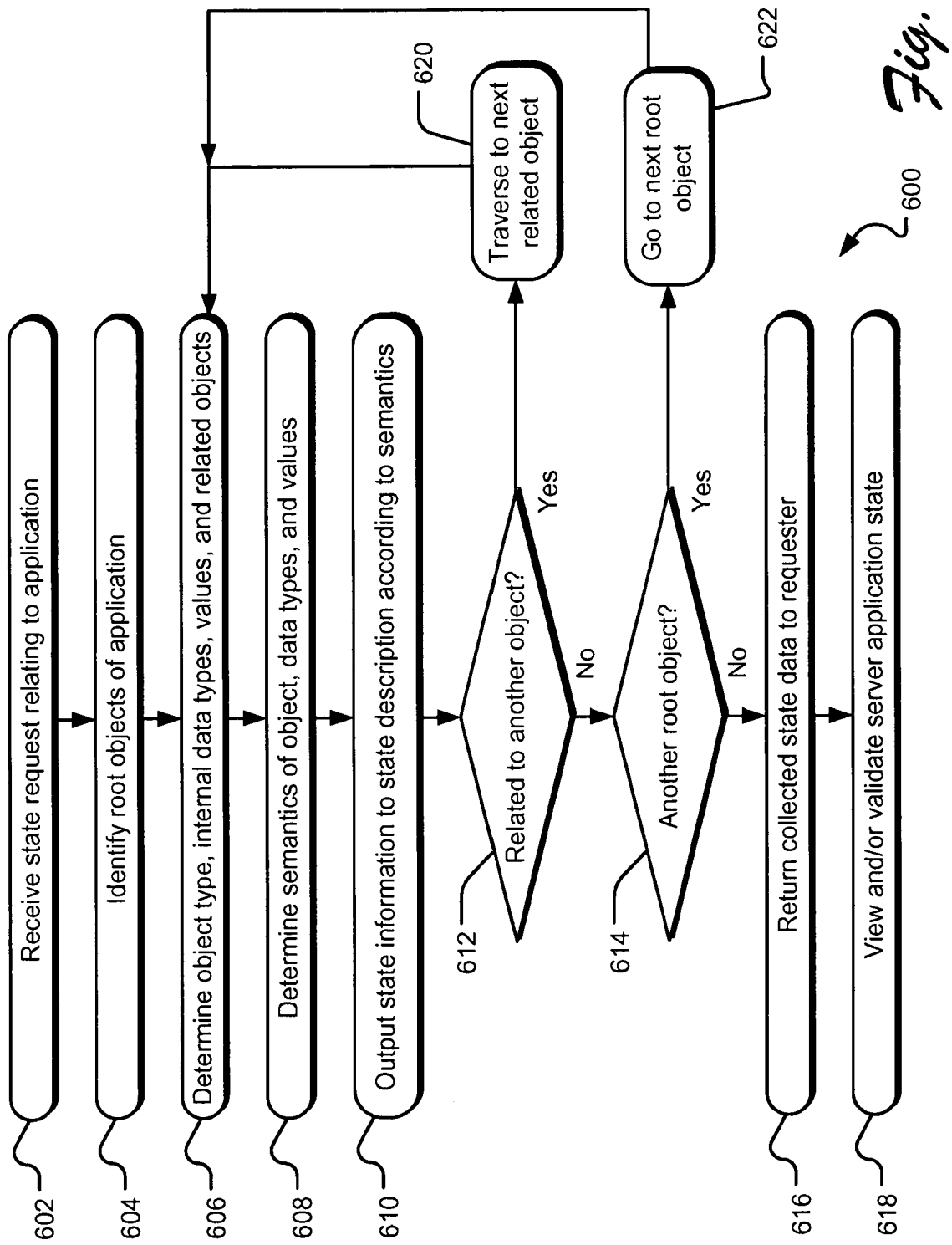
FIG. 6 illustrates exemplary operations for generating server application state descriptions.

FIG. 6 illustrates exemplary operations 600 for generating server application state descriptions. A request operation 602 receives a request for the server application state. In one implementation, the request operation 602 invokes a web method of a web service on an IIS application, which triggers the discovery process.

An identification operation 604 starts the discovery process by identifying the root objects of the server application. For example, the server application state tool may be hard coded to dynamically identify its root objects or the server application tool may be parameterized to start with one or more specified root objects of interest. Alternatively, the identification operation 604 may identify these root objects from a configuration file and locate them in the server application by using the identifiers (e.g., a GUID). Once these root objects are identified, a discovery operation 606 determines (e.g., via reflection or a standard interface) the type of the object (e.g., the object may be queried to yield its type), the object's internal data members, their types and values, and any related objects (collectively referred to as "state discovery results").

Based on the discovered information, a semantics operation 608 determines the output semantics associated with the object and each internal data type and interrelationship. For example, if the object includes a type foo, the semantics operation 608 can determine the appropriate semantics for representing the data type foo in the XML state description. In one implementation, the data types and their related semantics are specified in a semantics table (not shown) that associates individual types with output formats. A recording operation 610 stores the related object identifiers, object relationships, data types, and values to a state description, in accordance with the determined semantics.

A decision operation 612 determines whether another related operation exists. In one implementation, the recording operation 610 stores identifiers for discovered related objects into a list and the decision operation 612 checks the list to see if any additional related objects remain in the list. If so, a traversal operation 620 moves to the next related object in the list and continues the discovery process, recursively.

If no additional related objects exist, another decision block 614 determines another root object is available. If so, a traversal operation 622 moves to the next root object, and continues the discovery process, recursively, within the new root object hierarchy. If not, a return operation 616 returns the collected state description to the requester, and an analysis operation 618 presents the state description to a user, validates the server application state, flags errors in the state, etc.

It should also be understood that the discovery process may be executed on a server application supporting multi-threaded accesses to its state and to data upon which the application operations. As such, the discovery process can bring the application to an unchanging status where nothing in the application state is changing (e.g., by pausing all threads, by not receiving or operating on any inputs, by stopping any timer based operations, by obtaining a lock on the application state, etc.) while it collects the state information and writes it to the state description. Thereafter, the discovery process can release the application from the unchanging status. In this manner, this synchronization ensures that the obtained state description is a snapshot of the application state at an individual point in execution, rather than over relatively long periods of execution during which the application state can change substantially.

A validation operation (e.g., a possible part of analysis operation 618) can execute tests on the state description to identify possible application errors. In one implementation, these tests are defined as a set of rules, although other validation algorithms may be employed including programmatic or scripted-based validation of the state. For example, a rule may be configured such that if value A is greater than X, then value B must be greater than Y. The parameters for these tests may be provided within the application or from a validation file. Given the validation operation, the server application can identify state details that are abnormal and may contribute to the observed error in the worksheet presented to the client application.

FIG. 7 illustrates a redacted listing 700 of an exemplary XML server application state file. Lines 01-31 represent the server application state (note: there are entries redacted between line 26 and 27). A first object is listed in line 4, as an expandable node (as designated by the plus sign to the left of the object name. The object is identified by the IS "66540731" and is designated as a "_class_".

A second object is listed in lines 05-26, as an expanded node (as designated by the minus sign to the left of the object name. The m_accessModel field is identified as having the type Delegation. The m_unusedItemManagersDescription field is designated as "collection" containing two UnusedItemManagerDescription instances, with appropriate values and identifiers. Other data fields are listed in the file for the second object. Other objects are also listed, albeit collapsed in FIG. 7. A viewer or validation tool can operate on the data in the state description file to assist in the detection and correction of server application errors.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a rendering module, a calculation module, an application state tool, and other modules may be incorporated as part of the operating system 35, application programs 36, or other program modules 37. State description files, object data values, and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understood that the described technology may be employed independent of a personal computer. Other embodiments are therefore contemplated.

What is claimed is:

1. A computer-implemented method of providing a program state of an application, the method comprising:

receiving a state request for the program state of the application at an individual execution point of the application, wherein the application is a multi-threaded server application;

synchronizing the application and a state discovery process executed by a server at the individual execution point of the application and setting the application to an unchanging status;

identifying root objects of the application from an object hierarchy specifying object relationships within the application;

traversing a root object hierarchy of each root object to discover a state of an identified root object and each related object of the identified object at the individual execution point of the application, the root object hierarchy of an identified root object comprising the identified root object and each related object of the identified root object, wherein traversing each root object hierarchy of the object hierarchy produces state discovery results including data types and values for each object of the object hierarchy;

determining output semantics for each object of the object hierarchy based on the state discovery results;

generating a state description of the application at the individual execution point based on the state discovery results and the output semantics;

releasing the application from the unchanging status after generating the state description of the application at the individual execution point; and outputting the state description of the application at the individual execution point to a computing device.

2. The method claim 1 further comprising:
receiving the request for the state description from a user over a network; and
returning the generated state description to the user over the network.

3. The method claim 1 wherein the traversing operation comprises:
obtaining the state discovery results using reflection to determine related objects of each identified root object.

4. The method claim 1 wherein the traversing operation comprises:
obtaining the state discovery results through an interface in each object.

5. The method claim 1 wherein the determining operation comprises:
accessing a configuration file to obtain output semantics associated with a specified data type.

6. The method claim 1 wherein the state description of the application at the individual execution point provides a view of the object hierarchy including selectable nodes for selectively displaying state discovery results for the objects of the object hierarchy with each root object hierarchy comprising an expandable node.

7. The method claim 1 wherein the traversing operation comprises:
discovering internal data members for each object of the object hierarchy, the data type and value of each internal data member, and related objects of each object of the object hierarchy.

8. The method claim 1 further comprising:
validating the generated state description based on a set of conditional rules.

9. The method claim 1 further comprising:
validating the generated state description based on a validation script.

10. The method claim 1 wherein the application is a multi-threaded server-based spreadsheet application.

11. A computer program product comprising a computer-readable storage medium having computer-executable instructions stored thereon for performing a computer process for providing a program state of an application, the computer process comprising:
receiving a state request for the program state of the application at an individual execution point of the application, wherein the application is a multi-threaded server application;
synchronizing the application and a state discovery process executed by a server at the individual execution point of the application and setting the application to an unchanging status;
identifying root objects of the application from an object hierarchy specifying object relationships within the application;
traversing a root object hierarchy of each root object to discover a state of an identified root object and each related object of the identified object at the individual execution point of the application, the root object hierarchy of an identified root object comprising the identified root object and each related object of the identified root object, wherein traversing each root object hierarchy of the object hierarchy produces state discovery results including data types and values for each object of the object hierarchy;
determining output semantics for each object of the object hierarchy based on the state discovery results;
generating a state description of the application at the individual execution point based on the state discovery results and the output semantics;
releasing the application from the unchanging status after generating the state description of the application at the individual execution point; and
outputting the state description of the application at the individual execution point to a computing device.

12. The computer program product of claim 11 wherein the computer process further comprises:
receiving the request for the state description from a user over a network; and
returning the generated state description to the user over the network.

13. The computer program product of claim 11 wherein the traversing operation comprises:
obtaining the state discovery results using reflection to determine related objects of each identified root object.

14. The computer program product of claim 11 wherein the traversing operation comprises:
obtaining the state discovery results through an interface in each object.

15. The computer program product of claim 11 wherein the determining operation comprises:
accessing a configuration file to obtain output semantics associated with a specified data type.

16. The computer program product of claim 11 wherein the state description of the application at the individual execution point provides a view of the object hierarchy including selectable nodes for selectively displaying state discovery results for the objects of the object hierarchy with each root object hierarchy comprising an expandable node.

17. The computer program product of claim 11 wherein the traversing operation comprises:
discovering internal data members for each object of the object hierarchy, the data type and value of each internal data member, and related objects of each object of the object hierarchy.

18. The computer program product of claim 11 wherein the computer process further comprises:
validating the generated state description based on a set of conditional rules.

19. The computer program product of claim 11 wherein the computer process further comprises:
validating the generated state description based on a validation script.

20. A system for providing a program state of an application, the system comprising a processing unit executing computer-executable program modules stored in memory comprising:

an identification module that identifies root objects of the application from an object hierarchy specifying object relationships within the application, wherein the application is a multi-threaded server application;

a discovery module that receives a state request for the program state of the application at an individual execution point of the application, synchronizes the application and a state discovery process executed by a server at the individual execution point of the application, sets the application to an unchanging status, and traverses a root object hierarchy of each root object to discover a state of an identified root object and each related object of the identified object at the individual execution point of the application, the root object hierarchy of an identified root object comprising the identified root object and each related object of the identified root object, wherein traversing each root object hierarchy of the object hierarchy produces state discovery results including data types and values for each object of the object hierarchy;

a semantics module that determines output semantics for each object of the object hierarchy based on the state discovery results; and an output module that generates a state description of the application at the individual execution point based on the state discovery results and the output semantics and that outputs the state description of the application at the individual execution point to a computing device, wherein:

the application is released from the unchanging status after the state description of the application is generated at the individual execution point, and the state description provides a view of the object hierarchy including selectable nodes for selectively displaying state discovery results for the objects of the object hierarchy with each root object hierarchy comprising an expandable node.

* * * * *